United States Patent [19]

Aitken

[11] Patent Number: 5,722,258
[45] Date of Patent: Mar. 3, 1998

[54] APPARATUS FOR COMBINED HEAT AND MASS TRANSFER

[75] Inventor: William H. Aitken, Epping, England

[73] Assignee: The BOC Group plc, Windlesham, England

[21] Appl. No.: 690,268

[22] Filed: Jul. 24, 1996

[30] Foreign Application Priority Data

Jul. 28, 1995 [GB] United Kingdom ............... 95 15492

[51] Int. Cl.$^6$ ...................................................... F25J 3/00
[52] U.S. Cl. ...................... 62/643; 62/903; 196/100; 202/158; 261/112.2
[58] Field of Search ............... 62/643, 903; 202/158; 196/100; 261/112.2

[56] References Cited

U.S. PATENT DOCUMENTS

| 4,486,210 | 12/1984 | Gauthier | 62/903 |
|---|---|---|---|
| 4,599,097 | 7/1986 | Petit et al. | 62/903 |
| 4,606,745 | 8/1986 | Fujita | 62/903 |
| 4,950,430 | 8/1990 | Chen et al. | |
| 5,316,628 | 5/1994 | Collin et al. | |

FOREIGN PATENT DOCUMENTS

| 654 827 | 12/1937 | Germany. |
|---|---|---|
| 22 33 763 | 7/1972 | Germany. |
| 759 176 | 10/1956 | United Kingdom. |

*Primary Examiner*—Ronald C. Capossela
*Attorney, Agent, or Firm*—David M. Rosenblum; Salvatore P. Pace

[57] ABSTRACT

A liquid-vapor contact apparatus has pairs of vertical outer walls disposed in the manner of the vertical faces of a cuboid. The apparatus includes a plurality of spaced, parallel, vertical plates. Between each pair of adjacent plates there is a packing comprising a vertical array of corrugated liquid-vapor contact elements of the type that are used in structured packing. The corrugations in each element slope from top to bottom in a direction opposed to that in which the corrugations in contiguous elements slope. The two outermost plates form the walls of the apparatus. The walls comprise alternate edge portions of plates and of spacer bars. The plates define first and second sets of passages, respectively. One set of passages performs a first fractionation duty, and the other set another fractionation duty.

5 Claims, 2 Drawing Sheets

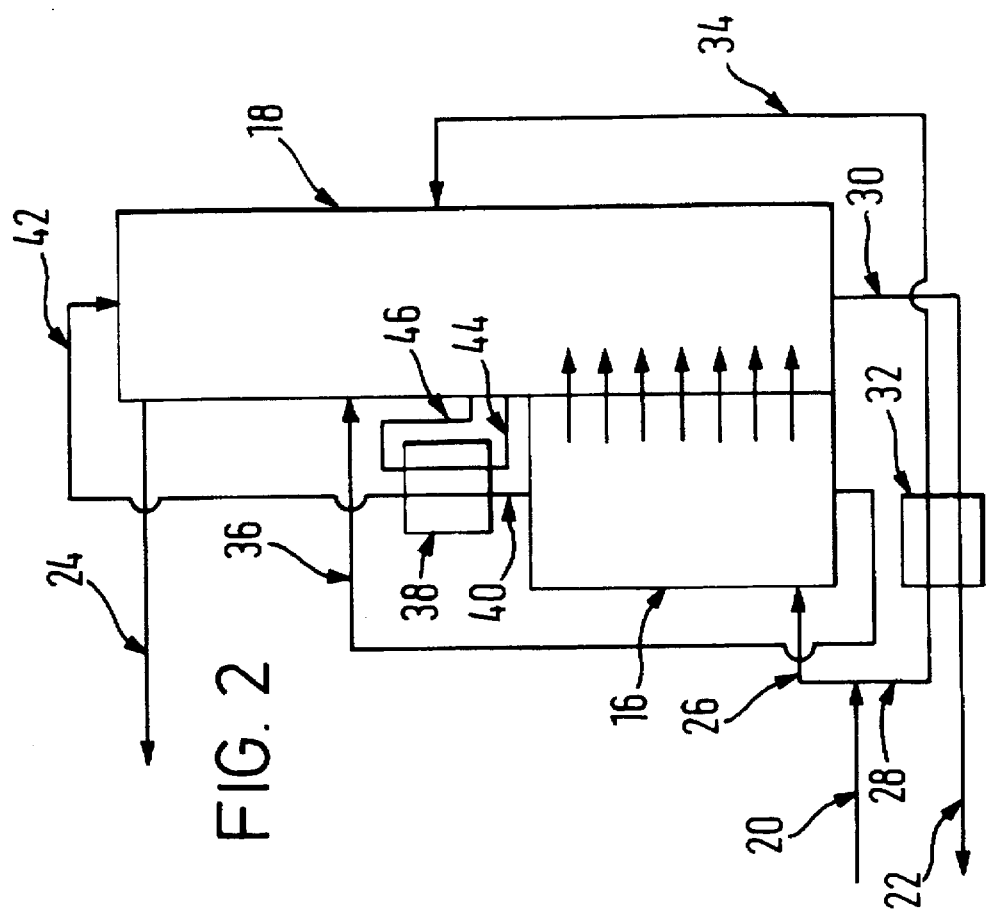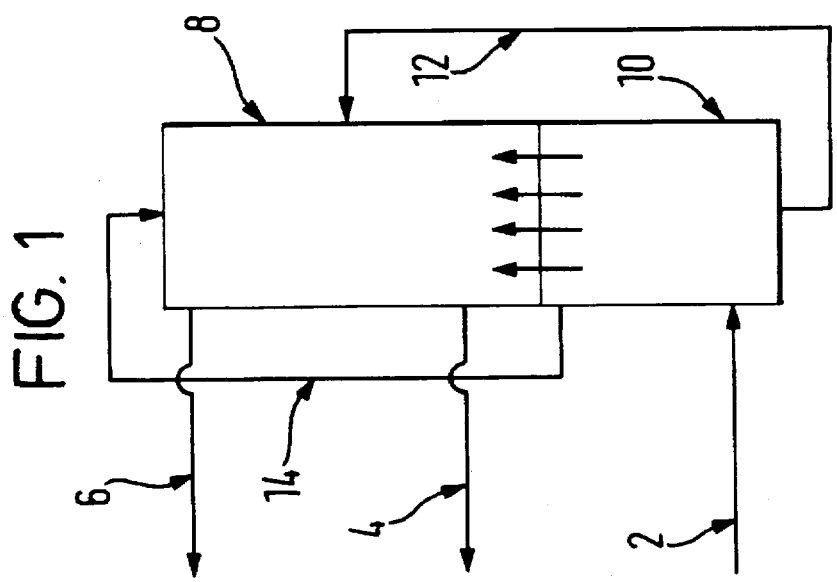

APPARATUS FOR COMBINED HEAT AND MASS TRANSFER

BACKGROUND OF THE INVENTION

This invention relates to an apparatus for liquid-vapour contact to provide mass transfer with simultaneous heat transfer to the contacting fluids.

There are areas of separation by fractional distillation where combined or simultaneous mass and heat transfer give energy savings. To date these have not been adopted to any significant degree due to no suitable easily manufactured device being available. This invention particularly relates to apparatus capable of simultaneous heat and mass transfer that can be manufactured by well established techniques.

A main area where combined heat and mass transfer can be used to reduce energy requirements is in the production of oxygen by air separation. The normal method of separation is in a double column consisting of a high pressure and a low pressure column. The air entering the high pressure column ascends the column and by the time it reaches the top is essentially pure nitrogen. The nitrogen is condensed by heat exchange which normally takes place in a single condenser-reboiler at the top of the high pressure and the low pressure column is partly or completely vaporised in the aforesaid condenser-reboiler by heat exchange with the condensing nitrogen.

GB-A-759 176 describes a process for the manufacture of oxygen where part of the heat exchange between the high pressure column and the low pressure column is continuous from the air inlet to the nitrogen outlet of the high pressure column on the one hand and from the reboiler to part way along the low pressure column on the other. Such an arrangement results in the air entering the high pressure column having a lower pressure than in the conventional manner and hence resulting in a saving in the compression power of the air. A problem in applying the principle described is in the availability of a device providing simultaneous heat and mass transfer that is easily manufactured. Especially the problem is in providing sufficient heat transfer surface associated with the mass transfer process. Our copending European patent application 96304325.2 describes a liquid-vapour contact apparatus manufactured in the manner of a plate-fin or matrix exchanger. The fins are constructed in the form of structured packing elements.

In particular, European patent application 96304325.2 provides a liquid-vapour contact apparatus having vertical outer walls disposed in the manner of the vertical outer walls of a cuboid, said apparatus including a plurality of spaced, parallel, vertical plates, there being between each pair of adjacent plates corrugated packing having chosen liquid and vapour flow characteristics, and wherein the outermost plates provide one pair of opposed, vertical, outer walls of the apparatus, and the other pair of such walls comprise alternate plate edge portions and vertical spacer members, characterised in that each packing comprises a vertical array of corrugated liquid-vapour contact elements arranged one above another, with the corrugations in each liquid-vapour contact element slanting from top to bottom in one direction towards one side of the packing and the corrugations in the or each liquid-vapour contact element contiguous thereto slanting from top to bottom in another direction towards the opposite side of the packing.

If instead of each passage of the above mentioned device carrying essentially the same flows of the same fluids different passages were used for different separation duties, where transfer of heat between one separation system and the other was required, then the requirements of simultaneous mass and heat transfer would be achieved. The device would have the heat transfer properties of plate-fin exchangers and the mass transfer properties of structured packing.

SUMMARY OF THE INVENTION

Accordingly, the present invention provides an apparatus according to European patent application 96304325.2 in which the plates define two sets of passages, one set of passages being associated with an inlet for a first fluid to be fractionated, and the other set of passages being associated with an inlet for a second fluid. Typically, the second fluid is also fractionated.

In the case of air separation one set of passages would be allocated to the high pressure column duty and the others to low pressure column duty. The ideal disposition of the vertical passages would be every alternate one for the high pressure column system and the others for the low pressure column system but this is not a necessity. Individual passage internal configuration and passage allocation would be determined by the flow and physical properties of the liquid and vapour undergoing separation.

In the case of for example air separation where simultaneous heat and mass transfer applies only to part of the low pressure column and the remainder of the low pressure column represents fractionation without heat exchange from outside the system then that part may be any conventional type of vapour-liquid contact device but could be conveniently made as the plate-fin device described in European patent application 96304325.2. It could additionally be made as a unitary construction with that part using the simultaneous heat and mass transfer principle which is the subject of this specification. Any conventional condenser evaporators required could be of plate-fin construction and could also be a unitary construction with any combination of simultaneous heat and mass transfer device and conventional liquid vapour contact device made according to European patent application 96304325.2

Another embodiment of the principle of continuous heat and mass transfer is the refluxing condenser or dephlegmator. Here a coolant normally at a constant temperature is used to provide condensation to a multi-component mixture undergoing separation. By having one set of passages allocated to the separating mixture using the device described and the other set of passages as conventional plate-fin heat transfer surface this effect will be achieved. Another variant of this principle would be where there was a heating fluid in the heat exchange passages.

The energy savings in an apparatus according to the invention is that described is achieved by condensing a minimum quantity of the condensing vapours at the lowest temperature and having a small temperature difference between the two sets of passages. The apparatus according to the invention is therefore capable of being used in heat integration situations other than air-separation.

BRIEF DESCRIPTION OF THE DRAWINGS

Apparatus for combined heat and mass transfer will now be described by way of example with reference to the accompanying drawings in which:

FIG. 1 is a diagrammatic representation of one form of a conventional air separation plant.

FIG. 2 is a diagrammatic representation of one type of air separation plant where the apparatus for combined heat and mass transfer can be used.

DETAILED DESCRIPTION

Figure 3:
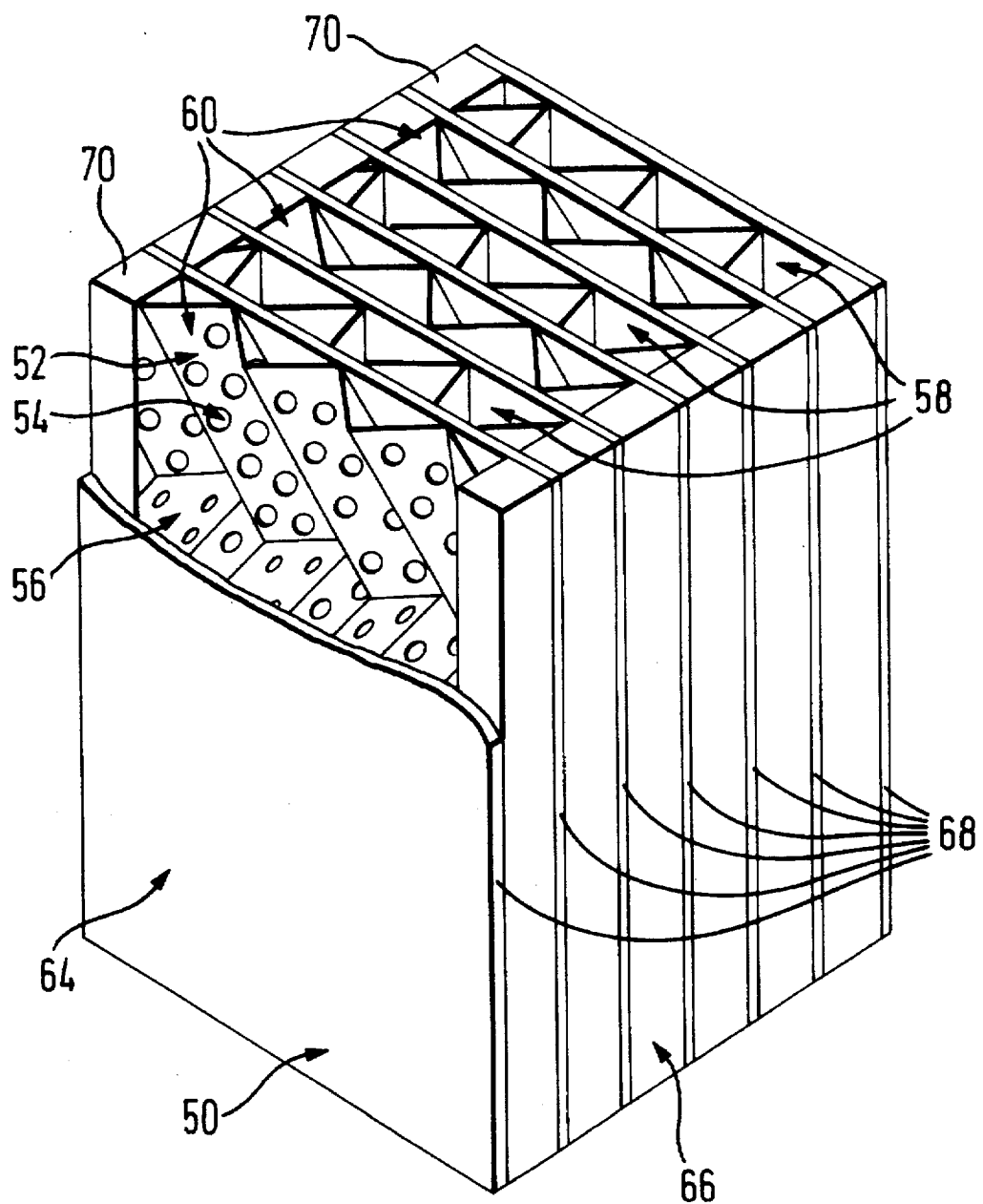
FIG. 3 is a schematic perspective view of the combined heat and mass transfer device.

In FIG. 1 an air stream 2 which has been compressed, its water and carbon dioxide content removed, and cooled by heat exchange with returning cold products 4 and 6 from a low pressure fractionation column 8 enters a high pressure column 10 at a pressure typically of about 5 bar and near its dew point. The air is separated in the high pressure fractionation column 10 into an oxygen rich liquid at its base and an essentially pure nitrogen vapour at its top. The oxygen rich liquid becomes the feed to the low pressure fractionation column 8 via the conduit 12. The nitrogen vapour is condensed in a condenser which is situated at the top of the high pressure column 10 and which is cooled by boiling liquid oxygen which collects at the base of low pressure column 8. The condenser is not shown but the arrows at the interface between the high pressure column 10 and the low pressure column 8 indicate the direction of heat exchange between the two columns. Part of the liquid nitrogen produced by condensation at the top of column 10 flows down it as reflux and the other part is directed to the top of column 8 via conduit 14 where it is used as reflux for column 8. A separation takes place in the low pressure column 8 into an oxygen product, which leaves the column via conduit 4 normally as a gas, but can be as a liquid, and an essentially pure gaseous nitrogen. The nitrogen leaves the column via the conduit 6. Such a plant would normally have heat exchangers, not shown here, in order to cool the liquid streams 12 and 14, typically using stream 6, to increase the efficiency of separation.

FIG. 2 shows a version of an air separation plant designed essentially to produce the same products as that in FIG. 1 but using the principle of combined heat and mass transfer. The principle of the operation of this type of plant is not new and is for example described in GB-A-759 176. The subject of this specification is to describe a new type of apparatus for achieving the simultaneous heat and mass transfer. Fractionation column 18 in FIG. 2 is the equivalent low pressure fractionation column to fractionation column 8 in FIG. 1 and fractionation column 16 is the equivalent of high pressure fractionation column 10. An air stream 20 from which water and carbon dioxide is removed and which is cooled by heat exchange to near its dew point against outgoing cold products 22 and 24 is divided into two streams, a main stream 26 and a minor stream 28. The minor stream 28 is used to vaporise a part of the liquid oxygen that accumulates at the base of the low pressure column 18 in condenser-evaporator 32. Conduit 30 connects the base of column 18 to condenser-evaporator 32. The air entering condenser-evaporator 32 through conduit 28 exits via conduit 34 as liquid air and is one of the feeds to low pressure column 18. The vaporised liquid oxygen 22 becomes the gaseous oxygen product from the plant after it has been heated by the incoming air.

The major portion of the compressed and cooled air 26 enters near the base of the high pressure column 16 where it is separated into an oxygen rich liquid at the bottom and an essentially pure nitrogen vapour at the top. The oxygen rich liquid becomes a feed to the low pressure column 18 via the conduit 36. In one arrangement the nitrogen vapour is condensed in a condenser-evaporator 38 situated preferably at the top of the high pressure column 16. The nitrogen vapour enters the condenser-evaporator 38 through conduit 40. The liquid nitrogen leaving 38 is directed to the top of column 18 via conduit 42 where it provides the reflux for column 18. The condensation in condenser-evaporator 38 is provided by drawing of liquid from the low pressure column 18 through conduit 44 and returning it a vapour through conduit 46 to the low pressure column 18. The condenser-evaporators 32 and 38 are shown diagrammatically only. The varieties of actual configurations are well established prior art.

The condenser-evaporators 32 and 38 only provide part of the heat exchange duty between columns 16 and 18. The fractionation in the high pressure column 16 takes place with simultaneous heat transfer to a part of the low pressure column 18. The section of low pressure column over which simultaneous heat and mass transfer takes place is dependent on having a positive and small temperature difference between the fluids in columns 16 and 18.

In FIG. 1 the heat exchange is between nitrogen vapour and liquid oxygen and this determines the condensing pressure and hence the pressure of the air. By the nature of the circuit in FIG. 2 it is air at its dew point that is exchanging heat with liquid oxygen and this determines the pressure of the air. According to the physical properties of nitrogen and air this will give a lower pressure for condensation of the air. The pressure of the air to a plant represented by FIG. 2 will be approximately 4 bar.

FIG. 3 shows an apparatus 50 for performing the aforesaid combined heat and mass transfer. The apparatus 50 is generally cuboid in shape with a first pair of opposed, vertical outer walls 64 and a second pair of opposed vertical outer walls 66. The apparatus 50 has a plurality of vertical, imperforate, plates 68 of heat conductive metal that are spaced equally apart from one another and extend in parallel with one another. The ends of the plates 68 are sealed by vertical spacing bars or members 70 extending from top to bottom of the apparatus 50. The two outermost ones of the plates 68 form the walls 65 of the apparatus 2. The walls 66 are formed from the edge portions of the vertical plates 68 and the vertical spacing bars or members 70. Each pair of adjacent plates 68 defines a vertical fractionation passage. One set of passages is identified in FIG. 3 by the reference numeral 58; the other set by the reference numeral 60. Each vertical passage has a packing comprising elements 52 typically in the form of sections of corrugated sheet metal. The corrugated sections typically have perforations 54. Perforations are only shown in one layer but will also be present in the others. The corrugations in each section extend at an angle to the horizontal. A typical angle is 45 degrees to the horizontal. Alternate sections in the vertical direction have corrugations sloping in opposite directions as shown by elements 52 and 56, where 52 slopes to the right and 56 slopes to the left (as shown). The alternate sloping elements normally go from top to bottom of the apparatus. Each individual element may have the same configuration as an individual element of a structured packing, for example, as illustrated in U.S. Pat. No. 4,296,050. FIG. 3 is diagrammatic and in practice the apparatus is made up of many layers of such vertical passages. The apparatus is conveniently constructed in the manner of a plate-fin exchanger. Whereas in the apparatus illustrated in European patent application 96304325.2 all passages have in essence the same liquid-vapour flows and compositions and form a single liquid-vapour contact system, in the present application alternate vertical passages carry a different liquid-vapour contact system and there is heat exchange between one contacting system and the other. The corrugations function as fins to increase the heat transfer area.

It will now be demonstrated how this device can achieve its function by relating it to the high pressure column 16 and low pressure column 18 as these are shown in FIG. 2. The passages 58 may form for example those carrying the liquid-vapour contact duty of high pressure column 16 and passages 60 those carrying out the liquid-vapour contact duty of that part of low pressure column 18 where heat exchange with the high pressure column is required. All similar vertical passages 58 are interconnected at the top and bottom as would all similar passages 60. There is an arrangement (not shown) to ensure essentially uniform distribution of downward flowing liquid between the different passages 58 and another for passages 60. The number of passages 58 may differ from the number of passages 60. Passage allocation is arranged to suit the different flows, compositions, pressures and temperatures of the individual systems. Fur the same reason, the configuration and dimensions of the elements for the individual systems 58 and 60 may be different.

I claim:

1. A liquid-vapour contact apparatus including:

vertical outer walls disposed in the manner of a cuboid;

a plurality of spaced, parallel, vertical plates;

corrugated packing located between each pair of said vertical plates and having liquid and vapour flow characteristics;

the outermost of said vertical plates providing one pair of said vertical outer walls;

the other pair of said vertical outer walls comprising alternate plate edge portions and vertical spacer members;

each packing comprising a vertical array of corrugated liquid-vapour contact elements arranged one above another, with the corrugations in each liquid-vapour contact element slanting from top to bottom in one direction towards one side of the packing and the corrugations in the or each liquid-vapour contact element contiguous thereto slanting from top to bottom in another direction towards the opposite side of the packing; and said vertical plates having two sets of passages, one set of passages being associated with an inlet for a first fluid to be fractionated, and the other set of passages being associated with an inlet for a second fluid.

2. The liquid-vapour contact apparatus as claimed in claim 1, in which the angle of slant of each corrugation is 45° to the horizontal.

3. The liquid-vapour contact apparatus as claimed in claim 1 or claim 2, forming part of a unitary apparatus additionally including a condenser-evaporator.

4. The liquid-vapour contact apparatus as claimed in claim 1, wherein the other set of passages is also a set of fractionating passages.

5. The liquid-vapour contact apparatus as claimed in claim 4, wherein one of the sets of passages is arranged to perform the duty of a high pressure air separation fractionation column and the other set of passages is arranged to perform the duty of part of a low pressure air separation fractionation column.

* * * * *